(12) United States Patent
Gharibe et al.

(10) Patent No.: US 10,878,979 B2
(45) Date of Patent: Dec. 29, 2020

(54) METHOD AND APPARATUS FOR WRAPPING ELECTRIC CABLES

(71) Applicant: certoplast Technische Klebebaender GmbH, Wuppertal (DE)

(72) Inventors: Samer Gharibe, Wuppertal (DE); Timo Leermann, Wuppertal (DE); Rene Rambusch, Wuppertal (DE)

(73) Assignee: certoplast Technische Klebebaender GmbH, Wuppertal (DE)

( * ) Notice: Subject to any disclaimer, the term of this patent is extended or adjusted under 35 U.S.C. 154(b) by 0 days.

(21) Appl. No.: 16/343,661

(22) PCT Filed: Nov. 15, 2017

(86) PCT No.: PCT/EP2017/079353
§ 371 (c)(1),
(2) Date: Apr. 19, 2019

(87) PCT Pub. No.: WO2018/091547
PCT Pub. Date: May 24, 2018

(65) Prior Publication Data
US 2020/0066427 A1 Feb. 27, 2020

(30) Foreign Application Priority Data
Nov. 18, 2016 (DE) .................. 10 2016 122 267

(51) Int. Cl.
*H01R 43/00* (2006.01)
*H01B 13/012* (2006.01)
(Continued)

(52) U.S. Cl.
CPC ... *H01B 13/01263* (2013.01); *B60R 16/0207* (2013.01); *F16L 3/06* (2013.01);
(Continued)

(58) Field of Classification Search
CPC . H01B 13/01263; B60R 16/0207; F16L 3/06; H02G 3/0481; B33Y 80/00; B33Y 10/00; Y10T 29/49194
(Continued)

(56) References Cited

U.S. PATENT DOCUMENTS 5,893,404 A * 4/1999 Mendez ................ B22D 11/00
164/71.1
9,310,081 B2 * 4/2016 Thomson ................ F23R 3/283
(Continued)

FOREIGN PATENT DOCUMENTS

| DE | 102008021841 A | 11/2009 |
|----|----|----|
| DE | 102011084786 A | 4/2013 |
| DE | 102016002977 A | 9/2016 |

*Primary Examiner* — Donghai D Nguyen
(74) *Attorney, Agent, or Firm* — Andrew Wilford

(57) ABSTRACT

A sleeve for insulated electrical cables is made by a generative manufacturing process whereby a stack of annular layers of a shapeless or shape-neutral material at a temperature below a melting point of insulation of the cables is formed on a base to build up thereon a tube. The cable bundle is passed through an opening in the base so that the series of layers built up on the base encloses the cable bundle as the tube. Finally, the tube formed by the stack of layers is cured and solidified layers around the electrical cables and is subsequently fixed to the cable bundle.

6 Claims, 2 Drawing Sheets

(51) Int. Cl.
*B60R 16/02* (2006.01)
*F16L 3/06* (2006.01)
*H01B 13/14* (2006.01)
*H02G 3/04* (2006.01)

(52) U.S. Cl.
CPC ........... *H01B 13/14* (2013.01); *H02G 3/0481* (2013.01); *Y10T 29/49194* (2015.01)

(58) Field of Classification Search
USPC .......................................................... 29/868
See application file for complete search history.

(56) References Cited

U.S. PATENT DOCUMENTS

| | | |
|---|---|---|
| 9,742,137 B2 | 8/2017 | Hobson |
| 10,068,680 B2 | 9/2018 | Mueller |
| 10,436,983 B2 * | 10/2019 | Perez ..................... B33Y 10/00 |
| 2015/0129726 A1 | 5/2015 | Sherman |
| 2015/0329069 A1 | 11/2015 | Daugherty |
| 2018/0131124 A1 | 5/2018 | Matlack |
| 2018/0247742 A1 | 8/2018 | Hitz |

* cited by examiner

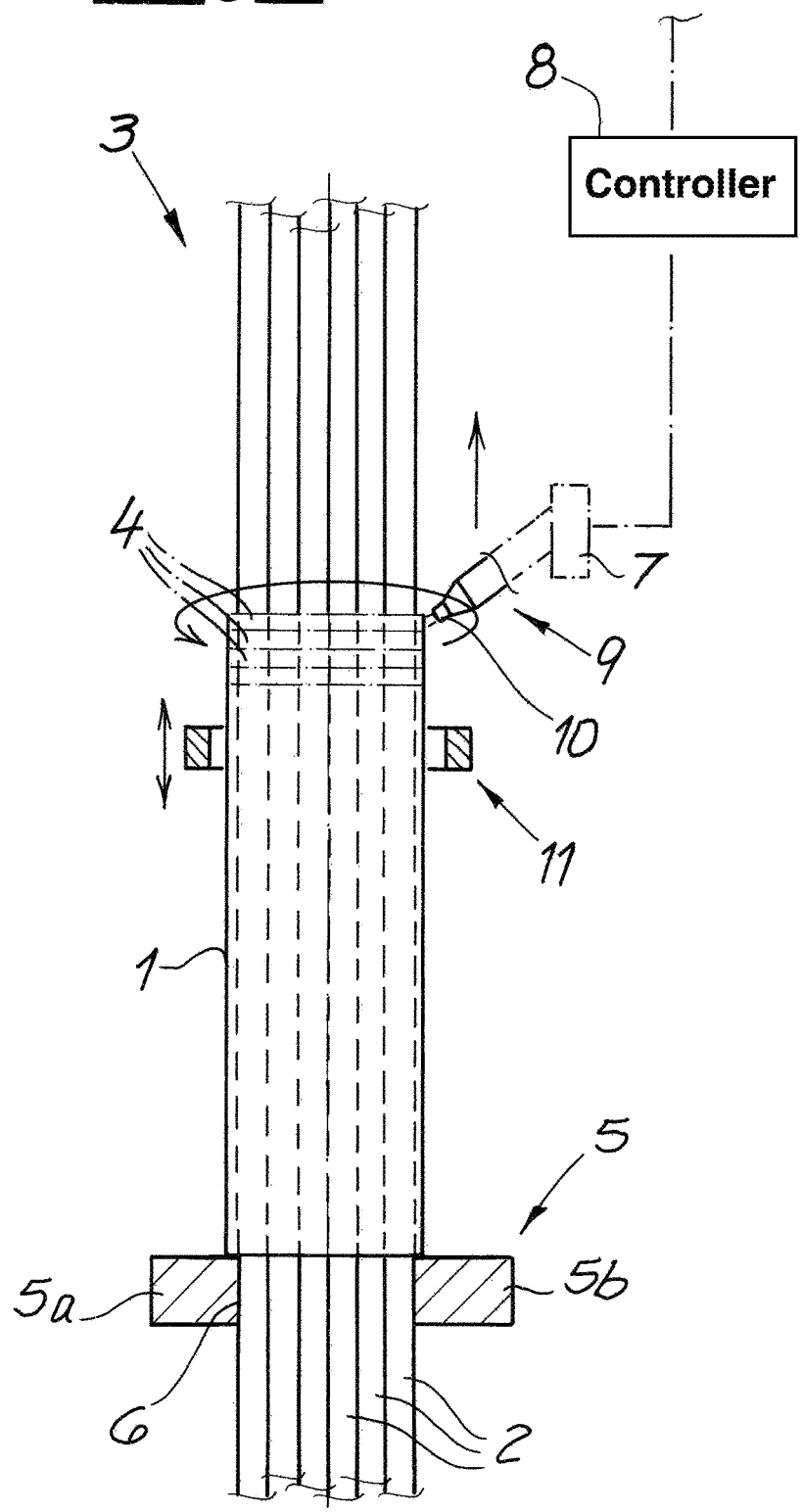

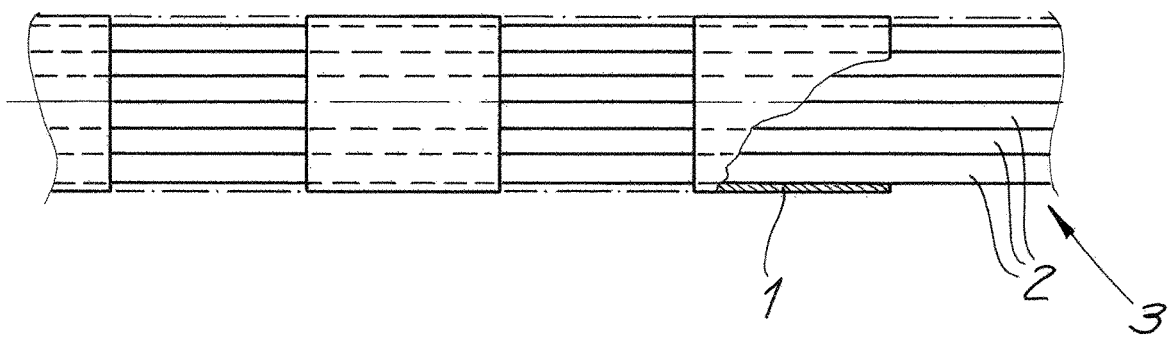
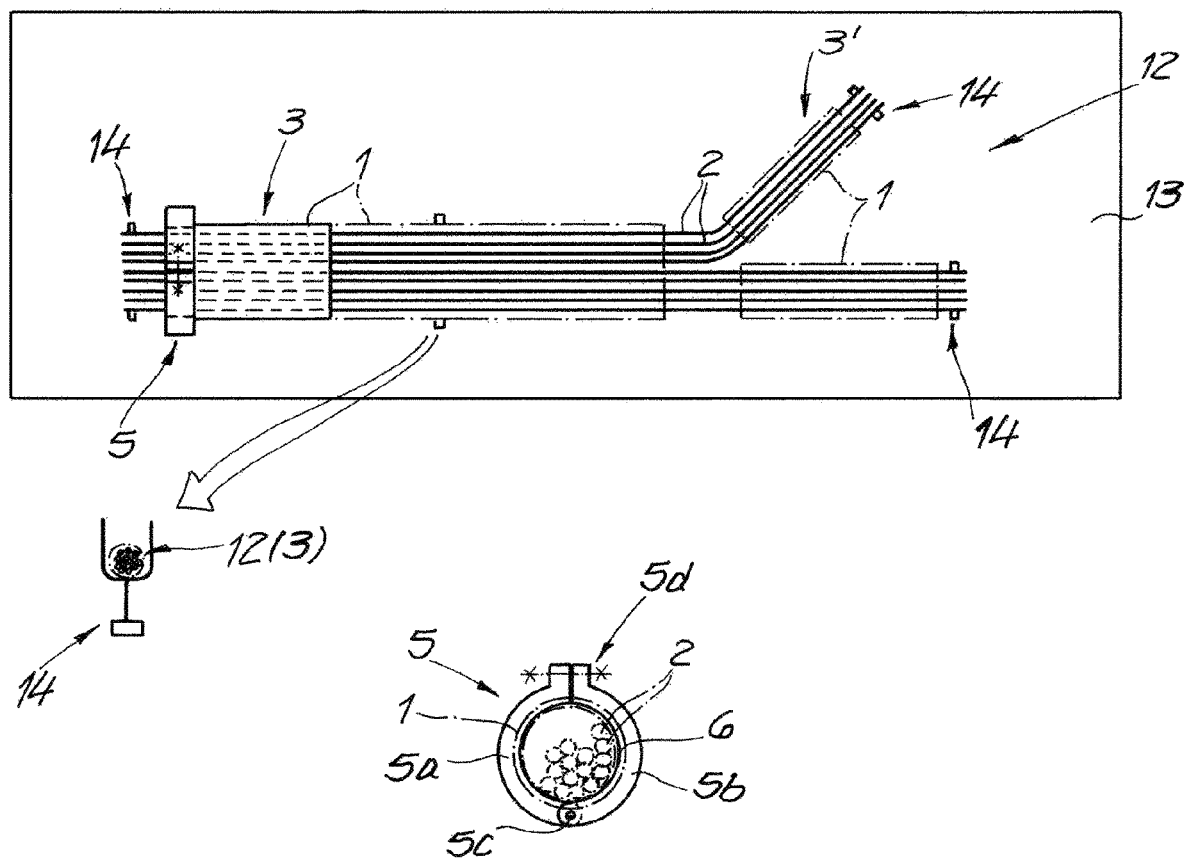

METHOD AND APPARATUS FOR WRAPPING ELECTRIC CABLES

CROSS REFERENCE TO RELATED APPLICATIONS

This application is the US-national stage of PCT application PCT/EP2017/079353 filed 15 Nov. 2017 and claiming the priority of German patent application 102016122267.4 itself filed 18 Nov. 2016.

FIELD OF THE INVENTION

The invention relates to a method of making a sleeve for electrical cables according to which the sleeve is made fully or partially by a generative manufacturing process through formation of a predetermined series of layers, and according to which the sleeve for bundling cables in automobiles into a cable bundle encloses the cable fully or partially as a flexible tube.

BACKGROUND OF THE INVENTION

In a method such as that known largely from WO 2014/089596 [U.S. Pat. No. 9,742,137], a guide or guide device made of plastic for electrical cables is described very generally. The guide device acts more or less as a solid or rigid sleeve for the cable in question as shown in FIG. 11 of that document, for example. Collaterally, WO 2014/089596 mentions the possibility in claim 21 of producing the guide device from plastic by so-called 3D printing, i.e. in the course of a generative manufacturing process.

Comparable prior art can be found in US 2015/0129726. That document also relates to guide means made of a rigid material for electrical cables. According to the explanations in ¶0019 of that document, if plastic is used here, the known guide devices can also be made by a 3D printing process.

The known procedures generally create generally rigid guide devices for electrical cables that usually protect the cables against mechanical influences, weathering, etc. In most cases, other supply lines are also housed, as it were, by the known guiding devices in addition to the electrical cables.

Quite independently of this, the sheathing of electrical cables in automobiles serves completely different purposes. In fact, in this context, the covering in question primarily ensures that the cables in question are grouped together to form a cable bundle. In addition, the covering provides mechanical protection for the individual cables and/or of the cable bundle. First of all, due to the specific application, the covering must be flexible in order to be able to follow the bent routing of a cable bundle made in this manner inside the automobile, for example. In addition, particularly when routing the cable bundle in question in the engine compartment, specific requirements with regard to the local temperatures and also with regard to resistance to any media must also be met.

A sleeve for bundling cables in automobiles is described in DE 10 2008 021 841, for example. There, an adhesive tape forming the sleeve is provided with a carrier made of a film body. The film body has a base film made of polyethylene. In addition, the film in question can be cross linked by electron beam irradiation or otherwise. The base film as such is made by blown film extrusion. This has been found to be advantageous in principle.

In the generic prior art according to DE 10 2014 216 761 [U.S. Pat. No. 10,068,680], the approach taken is such that a number of individual cables combined into a wiring bundle are provided with a bundling element. The bundling element is a textile-type fiber entanglement made by applying a suspension of fibers and binder to the wiring bundle. In principle, it is also possible to work in this context with a generative manufacturing process by building up a predetermined series of layers, because the suspension can be applied multiple times in alternation with drying phases or after-treatments.

The handling of films and, in particular, wrapping films made of a soft polyolefin for the manufacture of adhesive tape or even for direct sheathing of the cable in order to produce wiring harnesses in vehicles, more particularly motor vehicles or automobiles, by wrapping is not free of disadvantages. After all, such wrapping films can be relatively difficult to unwind and provide with an adhesive coating due to their surface-tackiness. The subsequent handling of adhesive tapes constructed in this way is also sometimes difficult.

To wit, the adhesive tapes in question are typically wrapped in a spiral or helically around the individual cables in order to produce the cable bundle and, ultimately, to produce the desired wiring harnesses in motor vehicles. Similar problems arise when a tube is inserted through a shaped fold of a piece of tubing extending axially. One further and serious disadvantage is that all the wrapping of the individual cables in order to produce wiring harnesses in motor vehicles or automobiles is done manually. In essence, this can be attributed to the fact that virtually every wiring harness is unique and that the production cannot yet be implemented with the aid of machines.

Finally, the teaching according to DE 10 2014 216 761 is associated with the fundamental disadvantage that the complexity of the production engineering in the execution of a layer sequence is relatively high due to the drying steps that are interposed. In addition, the textile-like fiber entanglement has an inhomogeneous overall construction, because it is ultimately composed of fibers and binder. The fibers are a multitude of disordered individual fibers whose cohesion is provided by the binder. Depending on the type and length of the individual fibers, this results in reduced flexibility on the part of a wiring bundle that is made in this way. Moreover, it is difficult to design such wiring bundles so as to be colored, for example.

OBJECT OF THE INVENTION

The object of the invention is to further develop such a method of making a sleeve for electrical cables such that cables can be successfully used in automobiles on the one hand and that manufacturing is simplified on the other.

SUMMARY OF THE INVENTION

To attain this object, a generic method of making a sleeve for electrical cables is characterized in the context of the invention in that the tube is constructed on a base, for which purpose the cable bundle is passed through an opening in the base, whereby the series of layers formed on the base encloses the cable bundle as a tube.

The tube for the cables is thus flexible at first, in contrast to the rigid guide devices of the prior art. In addition, the tube provides for partial or complete sheathing of the cables. That is, the cables are wrapped either along their full length with a continuous tube or partially with spaced tube segments. In any case, the tube is designed to be flexible, so that the cable bundle made in this manner can be easily routed three-dimensionally and, in particular, bent so that it can be routed in automobiles.

The tube can be molded directly onto the cable. Alternatively, however, the tube can also wrap the cables in question with clearance. In the latter case, however, the distance between the flexible tube and the sheathed cable is small, because surface coverage by the cables in the flexible tube of at least 70%, generally 80% and more in cross section is usually desired.

In the context of the invention, the flexible tube for bundling cables in automobiles to form a cable bundle and for making a commensurately assembled wiring harness is formed in a first alternative directly on the cable, particularly by a generative manufacturing process. In the second alternative, the cables are sheathed with a slight clearance, with the tube still being made by the generative manufacturing process. In principle, this can be done mechanically and without human intervention, so that, on the one hand, substantially reduced costs can be expected in comparison to the prior art, and, on the other hand, the flexibility that is required during the manufacture of wiring harnesses at least remains intact if it cannot even be increased.

The invention proceeds here from the discovery that the generative manufacturing process used to produce the flexible tube and the sheathing of the cable in order to produce the desired cable bundle and, ultimately, to produce the wiring harness for automobiles works such that a desired series of layers of the flexible tube sleeving is made from a shapeless or shape-neutral material by chemical and/or physical processes. In general, this series of layers is formed directly on the basis of three-dimensional values for the spatial position of the respective layer that are usually specified by a computer or a controller.

In other words, the generative manufacturing process builds up the flexible tube layer by layer. Each layer corresponds to a three-dimensional curve whose extent and position in space is specified by a computer or the controller. After the construction of the respective layer, it is generally cured. Chemical and/or physical processes are known to be available for this purpose. In contrast to blow-molded films, for example, a tool is not required for this purpose.

In addition, the layer or series of layers can be flexibly specified by the computer or the controller, so that the tube can ultimately take on or assume any conceivable geometry. For example, tubes that are curved or straight or even angled from the outset can also be easily produced in this manner without the need for special tools.

As noted previously, the tube can be made of a shapeless material. In principle, it can be a powder. Typically, however, a liquid is used. In fact, the invention recommends that a shapeless liquid be used that, advantageously and according to the invention, is a liquid plastic. A liquid plastic that is fluent when heated and can also be cured by crosslinking has been found to be particularly favorable. For example, photopolymers and, in particular, acrylate compounds are especially suitable. When in a heated state, such photopolymers can be processed by extrusion or applied through a die head.

In fact, in the context of the invention, the plastics or photopolymers in question are heated by a die head or otherwise and can leave the die head in molten form in order to construct the desired layer. The layer or the plastic made in this way can then also be cross linked. This can be achieved chemically through application of a crosslinking agent or also physically by electron beam irradiation or also UV irradiation. After the plastic in question has cured, the layer in question is immediately available as part of the flexible tube made in this manner.

As a rule, this procedure is continued here such that the material in question is wrapped around the cables at a processing temperature below the melting temperature of a cable insulation and then solidified. That is, in the processing of the shapeless material in question, more particularly of the liquid plastic, especially of the photopolymer, a configuration is advantageously used with which the plastic in question is applied, for example, at a temperature of 100° C., 150° C., 200° C., or 250° C. or even more. On the one hand, this depends on the melting temperature of the cable insulation that can be up to 250° C. On the other hand, it is also a matter of which alternative is used, of course.

In the event that the tube is applied directly and in layers to the cable bundle, i.e. that the tube is molded onto the cable, the temperature of the liquid plastic must be below the melting temperature of the cable insulation during application. However, if the flexible tube is caused to enclose the cable with clearance, then the processing temperature of the liquid plastic or photopolymer can also be set higher than the melting temperature of the cable insulation. Typical melting temperatures of cable insulation are up to 200° C. However, cable insulations made of ETFE (ethylene-tetrafluoroethylene copolymer), for example, or of PTFE (polytetrafluoroethylene) having melting temperatures of up to 250° C. can also be used.

Nevertheless, in order to provide the flexible tube made in this way with the necessary mechanical stability, the plastic in question is subsequently cross linked. This simultaneously also increases the melting point of the flexible tube made in this manner. In principle, it is also possible to use a shape-neutral material as the starting material for the production of the individual layers. In this case, the material is tape and/or wire-shaped.

Various basic approaches are conceivable in order to now bundle the individual cables and provide them with the flexible tube. Collectively, these are characterized in that the flexible tube is advantageously constructed by the series of layers of the individual initially liquid and then curing plastic. According to a first variant, the tube can be applied directly and in layers to the cables in order to produce the desired cable bundle in this way. In this approach, it is possible in principle to first provide the individual cables to be bundled or the cable bundle with an adhesive coating in order to subsequently apply the tube to the cable harness in layers.

Generally, such an adhesive coating can be omitted. After all, adhesion between the plastic of the cable insulation, usually PVC, and the plastic for the flexible tube, normally a photopolymer, occurs even without adhesion promoter, so that the flexible tube groups the cables together as desired and, at the same time, protects the cables during installation of the wiring harness made in this manner in the automobile.

Specifically, the tube can continue to be applied to the cable bundle layer by layer such that the tube is applied thereto in such a manner as to follow the longitudinal extension of the cable bundle. In this case, the die head is guided with the liquid plastic dispensed therefrom along the longitudinal extension of the cable bundle, for example. This can be done in two directions or simultaneously by two opposing die heads, the desired tube being applied to the cable bundle in one pass from two lateral halves, so to speak, and the flexible tube is thus molded against the cable as a result.

In the context of an alternative approach, however, the tube can also be formed around the cable bundle at an angle to the longitudinal extension of the cable bundle. In this case, the tube can be formed around the cable bundle in a spiral or helically, for example, so that the individual turns of the series of layers adjoin one another during the creation of the tube with overlap, as it were, thus covering one another. In contrast, the layers in the approach described first and the series of layers realized in that case are arranged one above the other or so as to follow the longitudinal extension of the cables.

In all of these cases, the tube is constructed according to the invention on the base. This is true even if the tube is (additionally) molded onto the cables. The base can generally be removed after making the tube. For this purpose, the base can be composed of two halves or half-shells, for example, that are hinged to each other and wrapped around the cable bundle to be sheathed in order to build up the series of layers.

After the tube has been made, the base constructed in this manner can be easily removed from the cable bundle from the two hinged-together half shells or semi-circles. In principle, the base can of course also be characterized by other details. What is crucial is that the base can be laid more or less flush around the cable bundle while also having an openable construction. Moreover, the base can be removed after the tube is made.

An additional and optional coating of the base on its outer side or surface facing toward the series of layers to be constructed ensures that the openable base can be easily removed again therefrom as well as from the cable bundle after production of the flexible tube. The coating can be a release agent or also an anti-blocking agent.

Starting from the base, the tube is constructed layer by layer as a sheath around the cable bundle. The cable bundle is passed through an opening of the base so that the series of layers for encasing the cable bundle is built up on the base. As a rule, the cable bundle and the base are at rest. It is also possible, however, for them to move relative to one another.

In this approach, the base extends transverse to the longitudinal extension of the elongated cable bundle or the individual cables to be sheathed. The series of layers or tube is now largely built up perpendicularly on the base, with the cable bundle extending through the opening. This enables the flexible tube to be built up directly at the desired location in order to enclose the cable bundle. Any branches or additional fastening means such as adhesive tapes, clamps, etc., may additionally ensure that the flexible tube made in this manner is secured on the cable bundle axially.

A method of making a sleeve for electrical cables is thus described and presented that by virtue of the generative manufacturing process used is especially suitable for automatic bundling of cables in automobiles into a cable bundle and is predestined for this purpose. After all, the flexible tube envelops the cables to be grouped together fully or partially in their longitudinal direction.

The invention also relates to an apparatus that is suitable for the manufacture of a sleeve for electrical cables and is equipped for this purpose with a manipulator and a die head that is connected to the manipulator for dispensing shapeless liquid material in the course of a generative manufacturing process. According to the invention, the apparatus is characterized in that the manipulator acts on the die head in order to produce a flexible tube for bundling cables in automobiles into a cable bundle such that the cables are enclosed by the tube.

The manipulator is advantageously a robot or robotic arm. The manipulator or robot is controlled in accordance with the specifications of a controller or a computer in order to output the shapeless liquid material via the nozzle connected to the manipulator for making the series of layers. For this purpose, the manipulator or the robot is provided with the spatial coordinates for each layer. In this context, the manipulator can produce a layer in one pass by a circular movement, for example. As will readily be understood, it is also possible to build up the layer not in a continuous circular motion, but by an arcuate reciprocating motion.

All of this is achieved in a simple manner, particularly in consideration of the manufacturing that is substantially simplified compared to the prior art, and especially due to the elimination of manual processing steps. Herein lie the fundamental advantages.

BRIEF DESCRIPTION OF THE DRAWING

The invention is explained in further detail below with reference to a schematic drawing that illustrates only one embodiment:

FIG. 1 shows an apparatus for making a sleeve for electrical cables and for bundling cables in automobiles into a cable bundle, FIG. 2 shows the cable bundle made in this manner in a side view, partly in section, FIG. 3 shows the cable bundle as part of a wiring harness manufactured on a molding board, and FIG. 4 shows detail of the base for the construction of the flexible tube.

SPECIFIC DESCRIPTION OF THE INVENTION

The drawing shows an apparatus for making a sleeve 1 for electrical cables 2. The sleeve 1 can enclose the cables 2 in question consistently over their entire axial length. This is shown by the dot-dash lines in FIG. 2. In addition, however, embodiments in which the sleeve encloses the cables 2 only in sections also lie within the scope of the invention. The solid lines in FIG. 2 correspond to this. In this embodiment, the cables 2 are electrical cables as components of a cable bundle 3 manufactured in this manner. The cable bundle 3 including sheath 1 is designed as part of a wiring harness 12 for electrical wiring in an automobile.

The wiring harness 12 is shown in detail in FIG. 3. In order for the wiring harness 12 to be made, and in order for the respective sleeve 1 of the individual cables 2 to be applied, the wiring harness 12 in question is received and held on a so-called molding board 13 in this embodiment. Such molding boards 13 are generally known in the art, for which reference should be made to DE 10 2011 084 786. Individual holders 14 and spacers 14 can be provided in order to hold the wiring harness 12 on the molding board 13.

The sleeve 1 is now made according to the invention fully or partially by a generative manufacturing process by building up a specified series of layers as indicated in detail in FIG. 1. In fact, a sleeve 1 formed as a flexible tube 1 that covers the cable 2 fully or partially in its longitudinal direction can be seen in detail in FIG. 1. The cables 2 are bundled into the cable bundle 3 by the flexible tube 1. The wiring harness 12 is then constructed from the individual cable bundles 3 for installation in the automobile (not shown).

The generative manufacturing process of this invention is characterized in that the sleeve, more particularly the flexible tube 1, is made by individual layers 4 that, in this embodiment according to FIG. 1, are built one on top of the other and adjoin one another such that a more or less cylindrical flexible tube 1 is made from the individual annular layers 4. The layers 4 thus form the series of layers that is molded by the generative manufacturing process against the cable 2.

It can be seen that the flexible tube 1 encloses the cable 2 in the context of the illustration of FIG. 1 or the cable bundle 3 grouped together in this manner with little clearance. That is, the flexible tube 1 rests against the cable bundle 3 with clearance and also ensures mutual fixation of the cables 2 to one another in order to group them into the cable bundle 3. The tube 1, in turn, can be secured to the cable bundle 3 axially by an adhesive tape or other fastening means, for example. In principle, a branch 3' of the cable bundle 3 as shown in FIG. 3, or other elements, for example, ensure that the flexible tube 1 is secured axially.

The tube 1 can be applied directly and in layers to the cable bundle 3 that is not shown, however. In fact, the individual layers 4 of the flexible tube 1 can be formed as a spiral around the cable bundle 3 at an angle to the longitudinal extension of the cable bundle 3. In this case, the individual layers 4 again define a largely cylindrical body, but in such a way that the individual layers 4 are formed helically around the cable bundle 3 while overlapping at least partially. This is not shown altogether.

In the context of the embodiment, the layers 4 and the series of layers made therefrom are constructed such that the individual layers 4 are stacked on top of one another, as it were, thereby forming and defining the cylindrical flexible tube 1. For this purpose, the tube 1 in question is constructed on a base 5. This also applies in principle to a case in which the individual layers 4 of the flexible tube 1 are formed around the cable bundle 3 in a helical manner after being built up on the base 5 and overlap at least partially. This also applies when the individual layers 4 are formed on the cable bundle 3. One way or the other, in this embodiment the base 5 is formed as a disk with a central opening 6 for the cable bundle 3 so as to guide same. In the present case, the base 5 and the cable bundle 3 are designed to be stationary. In principle, however, the base 5 can also rotate. Likewise, a relative movement between the base 5 and the cable bundle 3 is possible.

The detailed structure of the base 5 can be seen in FIG. 4. It can be seen here that the base 5 has an overall multipart construction and can be disassembled. In this embodiment and without limitation thereto, the base 5 is formed by two half-shells or two semicircles 5a, 5b that are coupled to one another at a pivot 5c. An additional closure 5d ensures that the two half-shells 5a, 5b that are fitted around the cable bundle 3 or the individual cables 2 are secured to one another in the installed state. The openable base 5 constructed in this manner can enclose the cable bundle 3, even when it is fixed on the molding board 13 as shown in FIG. 3.

To this end, it is only necessary to align the molding board 13 appropriately relative to a die head 10 and a manipulator 9 that will be described in greater detail below. In fact, the approach taken will usually be such that the molding board 13 or, generally, a holder 14 for the wiring harness 12 on the one hand and the die head 10 on the other hand can each be moved spatially independently of one another. In principle, however, it is also possible for either only the molding board or the holder 13 or only the die head 10 to be spatially movable.

In this embodiment, the base 5 and the cable bundle 3 are each stationary. The cable bundle 3 with its cables 2 to be bundled is passed through the opening 6 in the base 5. A drive 7 that acts on the above-described manipulator 9 can be seen in FIG. 1. A controller 8 that acts on the drive 7 and the manipulator 9 is provided for this purpose. The drive 7 can move the manipulator 9 axially as indicated in FIG. 1, so that the series of layers built up there on the base 5 can be created. In addition, the manipulator 9 ensures that the connected die head 10 performs the circular or arcuate movements shown in FIG. 1 in order to produce the series of layers. The manipulator 9 may be a robot or robotic arm that can generally perform three-dimensional movements.

A strand of shapeless liquid material in the form of a liquid plastic, such as a photopolymer, for example, is emitted by the die head 10. A first layer 4 is first built up directly on the base 5 by to the manipulator 9 that is moved by the controller 8, performing a circular movement that is only implied in FIG. 1 around the cable bundle 3 that is passed through the opening 6. After the first layer 4 has cured, the manipulator 9 applies another, second layer 5 with the die head 10 to the first layer 4, so that the above-described cylindrical flexible tube 1 defined by the series of layers is ultimately built up on the base 5 due to the series of layers or the tube 1 surrounding the opening 6 with the cable bundle 3 that is guided therethrough.

The tube 1 is thus built up on the base 5. Starting from the base 5, the tube 1 encloses the cable bundle 3. The individual layers 4 of the series of layers and hence of the flexible tube 1 are made on the base 5 at a build-up rate. A treatment unit 11 is provided in order to cure the photopolymer used here and emitted by the die head 10 in liquid form. In this embodiment, the treatment unit 11 can reciprocate at least axially along the cable bundle 3, as indicated by a double arrow in FIG. 1. The treatment unit 11 can thus be used for the physical treatment of the series of layers or of the respective layer 4.

The treatment unit 11 is one that is used for the physical solidification of the individual layers 4 and/or of the flexible tubular sleeve 1 formed in this way. In principle, however, the layers 4 can also be solidified chemically, which is not shown in detail, however. In fact, in this embodiment, the treatment unit 11 radiantly crosslinks the plastic, polyethylene in the example. Through the crosslinking of the respective layer 4 by the treatment unit 11 or the UV embodied here, the layer 4 is cured in steps. Finally, the base 5 can then be removed and the flexible tube 1 is left in position at the desired location on the cable bundle 3.

The invention claimed is:

1. A method of making a sleeve for insulated electrical cables by a generative manufacturing process comprising the steps of:
   forming on a base a stack of annular layers of a shapeless or shape-neutral material at a temperature below a melting point of insulation of the cables and thereby building up a tube on the base; and
   passing the cable bundle through an opening in the base so that the series of layers built up on the base encloses the cable bundle as the tube; and
   curing and solidifying the stack of layers around the electrical cables and subsequently fix the tube to the cable bundle.

2. The method according to claim 1, wherein the layers forming the tube are applied directly to the cable bundle.

3. The method according to claim 1, wherein the tube is applied to the cable bundle along its longitudinal extension.

4. The method according to claim 1, further comprising the step of:
   forming the layers of the tube around the cable bundle as a spiral from a strand of the material extending at an angle to a longitudinal extension of the cable bundle.

5. The method according to claim 1, wherein the material is solidified by being cross linked radiantly by UV rays.

6. An apparatus for making a sleeve for electrical cables, the apparatus comprising:
- a manipulator;
- a die head connected to the manipulator for dispensing a strand of shapeless or shape-neutral but hardenable liquid material at a temperature below a melting temperature of insulation of the cables in a generative manufacturing process with the manipulator moving relative to the die head in order to produce a stack of layers forming on a base a flexible tube to bundle cables in automobiles into a cable bundle in order to enclose the cable by the tube;
- a base on which the layers are deposited to build up the tube from the liquid material, the cable bundle passing through an opening in the base so that the series of layers formed on the base encloses the cable bundle as the tube; and
- source of UV radiation for curing and solidifying the material of the tube around the cable bundle and subsequently fixing the tube to the bundle.

\* \* \* \* \*